United States Patent [19]

Zucker

[11] Patent Number: 4,565,638
[45] Date of Patent: Jan. 21, 1986

[54] METHOD FOR PURIFYING INK

[76] Inventor: Jerry Zucker, 16 Buckingham Dr., Charleston, S.C. 29407

[21] Appl. No.: 534,676

[22] Filed: Sep. 22, 1983

[51] Int. Cl.$^4$ .................... B01D 35/18; C02B 1/02
[52] U.S. Cl. ........................... 210/774; 210/90; 210/178; 210/179; 210/181; 106/20
[58] Field of Search ............... 210/767, 90, 175, 177, 210/178, 179, 181, 774, 805, 739, 741, 790; 106/20; 118/603, 602, 612; 427/345

[56] References Cited

U.S. PATENT DOCUMENTS

| | | | |
|---|---|---|---|
| 181,597 | 8/1876 | Robertson | 106/20 |
| 2,590,538 | 3/1952 | Huck | 118/602 |
| 3,123,579 | 3/1964 | LeFevre | 118/603 |
| 3,250,242 | 5/1966 | Pekarek | 210/90 |
| 3,341,449 | 9/1967 | Howard | 210/181 |
| 3,983,837 | 10/1976 | Francis | 118/603 |
| 4,007,684 | 2/1977 | Takano et al. | 118/602 |
| 4,179,019 | 12/1979 | Danziger | 208/179 |
| 4,219,577 | 8/1980 | Pedersen et al. | 426/697 |
| 4,276,327 | 6/1981 | Hue et al. | 427/345 |
| 4,391,638 | 7/1983 | Fusco et al. | 210/805 |
| 4,432,894 | 2/1984 | Kamiya et al. | 210/739 |

Primary Examiner—Barry S. Richman
Assistant Examiner—Titus B. Ledbetter, Jr.
Attorney, Agent, or Firm—Gary, Juettner & Pyle

[57] ABSTRACT

Excess or unused ink that is recovered from a printing process and which contains fibrous impurities is purified by mixing the recovered ink with virgin ink, heating the mixture to decrease the viscosity thereof, and then straining and filtering the heated mixture.

4 Claims, 1 Drawing Figure

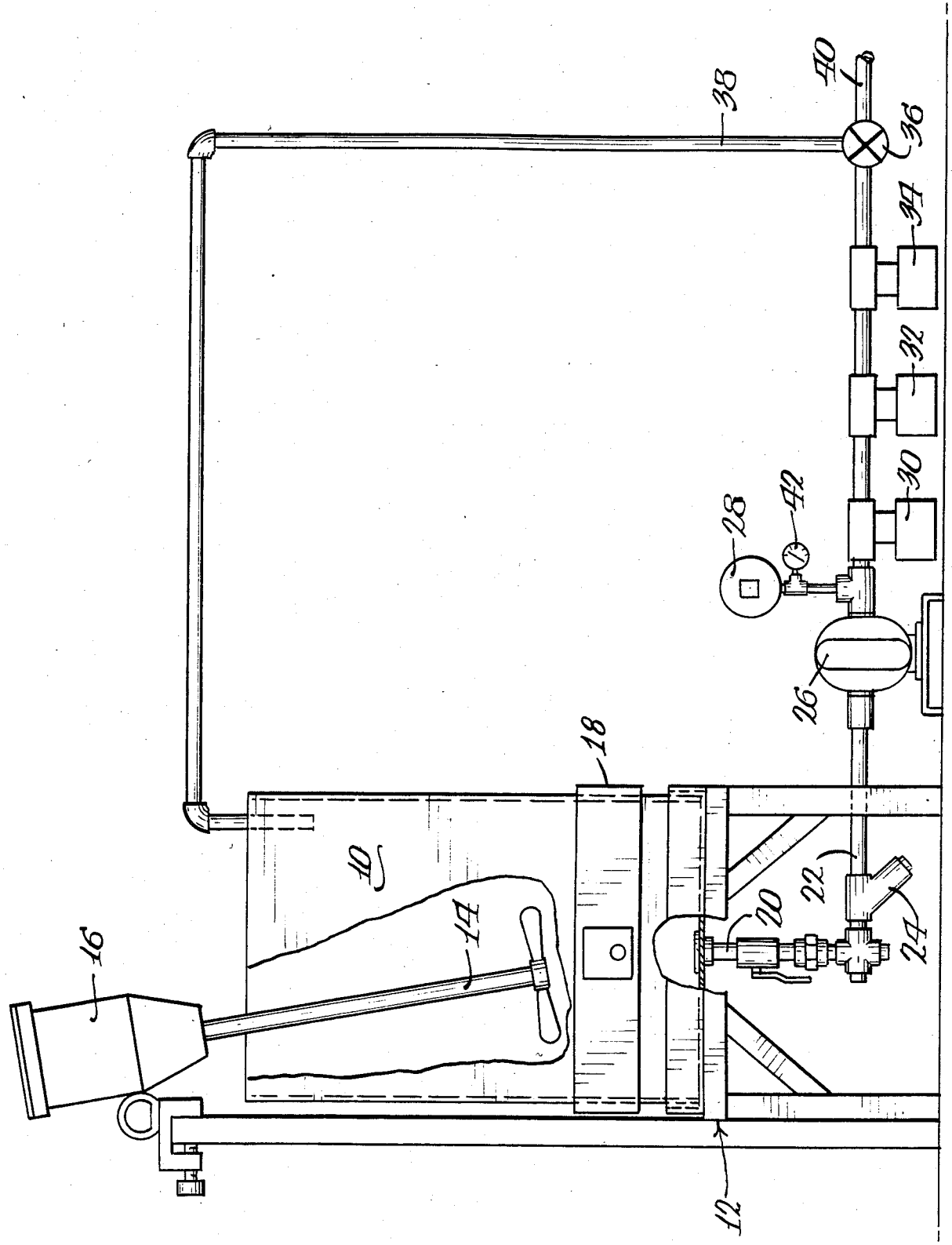

METHOD FOR PURIFYING INK

BACKGROUND OF THE INVENTION

In normal newsprint or other printing operations, an excess of printing ink must be employed, and such excess becomes contaminated with lint and other foreign materials. While it would be desirable to recover and reuse such excess ink, the lint and other solid contaminants must first be removed. Because of the high viscosity of the recovered ink, however, normal filtering methods cannot be employed.

SUMMARY OF THE INVENTION

The present invention provides a method and apparatus for successfully purifying and recycling printing inks in an economical and efficient manner. A volume of the used, lint-containing ink is first mixed with a larger volume of virgin or unused ink, and the mixture is then heated and agitated to lower the viscosity significantly. The heated mixture is then passed through a filter means to remove the contaminants, whereupon the ink may be recycled.

THE DRAWING

The FIGURE is a side view of the apparatus of the present invention.

DESCRIPTION OF THE PREFERRED EMBODIMENT

As illustrated in the FIGURE, the apparatus comprises a drum or tank 10 supported in a raised position by a suitable support framework 12. A propeller mixer 14 is disposed in the tank 10 and is driven by a motor 16 supported on the framework 12.

Means are provided for heating the tank 10, such as a thermostat controlled heater 18 surrounding the drum 10 so as to heat the contents thereof.

The bottom of the drum 10 is equipped with a valve 20 enabling discharge of the contents of the drum. Valve 20 is connected to a line or pipe 22 to which is connected, in series, a strainer 24, a pump 26, a pressure sensing device 28, and a series of filters, such as 30, 32 and 34. The filters may be followed by a three-way valve 36 connected to a return hose 38 and a recirculating pipe 40 leading back to the tank.

The strainer 24 may be of the conventional screen type and is inserted upstream of the pump 26 to remove large foreign particles prior to entry of the recycled ink into the pump. The pressure sensing device 28 is preferably equipped with a pre-set limit and connected to an alarm device (not shown) that will be activated if the line pressure exceeds a predetermined limit, which would occur if the filters were clogged. A pressure gauge 42 may also be included to visually indicate line pressure.

The filters 30, 32 and 34 preferably contain replaceable filtering elements, such as bag-type elements. Although a single filter may be employed, it is preferable to employ a series of filters having progressively decreasing mesh sizes from filter 30 to filter 34, thereby removing the finest contaminants at the last filter 34.

In order to use the apparatus to recycle ink, a quantity of the impurity-containing ink is first introduced into the tank 10. A quantity of new or virgin ink is also introduced at this time. Preferably, the quantity of virgin ink introduced will be greater than the quantity of used ink.

The virgin ink will typically contain a black pigment, whereas the used ink may contain a mixture of various colors. The virgin ink therefore enhances the purity of color of the mixture and also dilutes the impurities present in the used ink and increases the fluidity thereof. If additional pigmentation is required, concentrated pigment dispersion may be added during the mixing step.

The mixture in the tank is then agitated with the mixer 14 while heating with the element 18. the final temperature of the tank will preferably be in the order of 150 to 200 degrees F. Heating and agitation is continued until a uniform color is obtained and until the heated mixture has a reduced viscosity.

The heated mixture is then purified by opening the valve 20 and operating the pump 26 to cause flow from the tank 20 and through strainer 24, followed by pressurized flow through filters 30-34. All or a portion of the purified ink, if desired, may be recycled through the return line 38 back to the tank, or the mixture may be delivered to a holding tank through hose 40.

I claim:

1. Method for purifying used printing ink containing impurities comprising the steps of first combining a volume of the used ink with a greater volume of virgin ink to reduce the level of impurities in the combined volume, heating and agitating the mixture to reduce the viscosity thereof, and then removing the impurities from the heated mixture.

2. The method of claim 1 wherein the mixture is heated to a temperature of from about 150 to about 200 degrees F.

3. The method of claim 1 wherein the impurities are removed by passing the heated mixture through a series of progressively finer filters.

4. The method of claim 3 wherein the heated mixture is pumped under pressure through the filters.

* * * * *